May 24, 1932.  J. C. LEBHERZ  1,860,290
PLIERS
Filed May 5, 1931
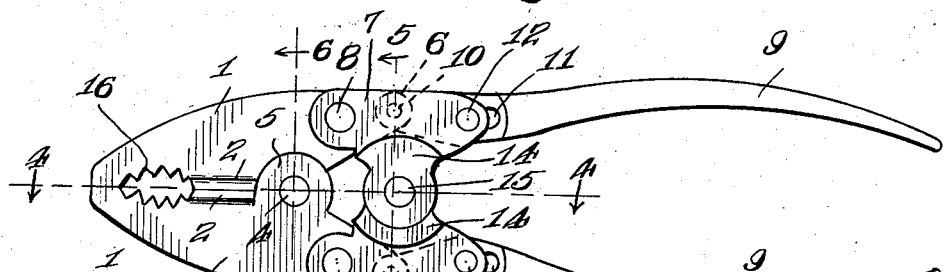
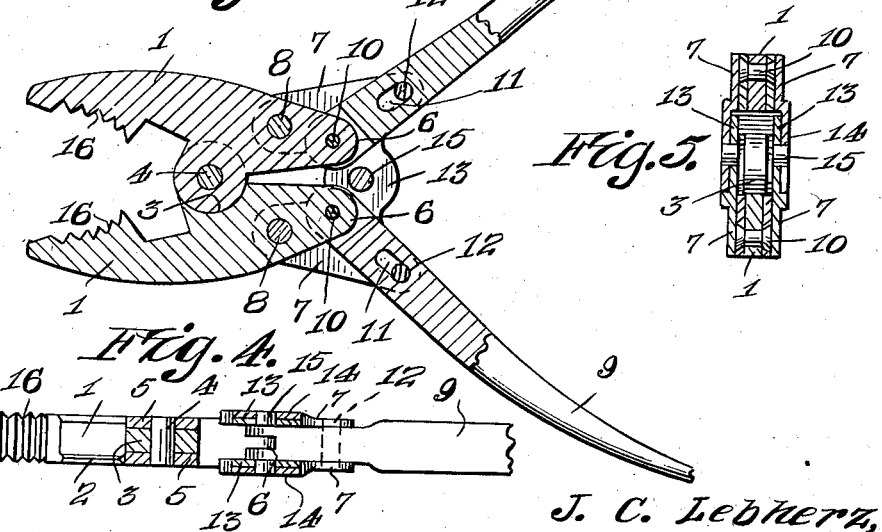
J. C. Lebherz,
INVENTOR
BY Victor J. Evans and Co.
ATTORNEY Patented May 24, 1932

1,860,290

UNITED STATES PATENT OFFICE

JOHN C. LEBHERZ, OF NENANA, ALASKA

PLIERS

Application filed May 5, 1931. Serial No. 535,227.

My present invention relates to pliers, and the primary object thereof is the provision of a pair of pliers of such construction and arrangement of parts that a greater gripping action, between an object and the jaws of the pliers may be obtained in an easy manner and with less expenditure of strength than is necessary in the operation of the ordinary pliers.

A further object is the provision of a combination tool, that is, a tool which essentially comprises a pair of pliers but which may be also successfully used as a jaw wrench, or a wire cutter.

A further object is the provision of a tool of this character that is characterized by simplicity in construction, and thorough efficiency in practical use.

To the attainment of the foregoing the invention consists in the improvement hereinafter described and definitely claimed.

In the drawings:

Figure 1 is a plan view of the improvement.

Figure 2 is a side elevation thereof.

Figure 3 is a side elevation of the jaws opened and parts in section.

Figure 4 is a sectional view approximately on the line 4—4 of Figure 1.

Figure 5 is a sectional view approximately on the line 5—5 of Figure 1.

Figure 6 is a sectional view approximately on the line 6—6 of Figure 1.

As disclosed by the drawings my improved tool comprises a pair of cooperating and substantially similar jaw members 1—1, the jaws at the meeting or active faces thereof being concaved and toothed and each of the jaws, inward of the teeth and on one side thereof is provided with cutting blades 2 which are arranged in shearing relation. Each jaw, adjacent to the inner end thereof, is formed with a rod extension in the nature of ears, one of the jaws being formed with a single ear 3 and the other jaw having its ear portion bifurcated to receive the ear 3 therein, the said ears being pivotally connected, as at 4. The ears have their outer edges rounded and the jaw 1 provided with the single ear has its sides recessed to receive the ears 5 of the cooperating jaw therein. From the pivots 4 the jaws are continued rearwardly for a suitable distance and have their ends terminating in separable and reduced rounded tongues or ears 6. Outward of the ears each of the jaws 1 has its sides formed with depressions whose inner walls are rounded, and in each of these depressions there is received one of the rounded ends of a link 7. Pivots 8 pass through the said ends of the links and through the said reduced sides of the jaws.

The arched handles of the improvement are indicated by the numeral 9, each of which having a reduced end to be received between the spaced pairs of links 7 and the said reduced ends of the handles are bifurcated and receive therein the tongues or ears 6 of the jaws 1, the said handles being pivotally secured to the said tongues, as indicated in the drawings by the numeral 10. The handles, outward of their bifurcated and pivoted ends, are each formed with an elongated longitudinally extending slot 11 and through these slots there are passed pivot pins 12 that also pass through the outer ends of the links 7.

Each pair of links 7 is formed, at the center thereof, with an inwardly extending ear 13, the said ears being in lapping relation and in order to strengthen the links at the connection of the ears therewith the outer faces of the said links are thickened, as at 14. There are passed through the pairs of lapping ears 13 pivot members 15.

With my construction of tool it will be noted that when the handles 9 are swung away from each other the jaws 1 will be likewise swung or spread away from each other. Because of the slots 11 in the handles the jaws 1 can be swung away from each other for a determined distance greater than may be accomplished by an ordinary pair of pliers. By providing the links a powerful leverage is afforded the handles in swinging the jaws against each other so that objects contacted by the toothed faces 16 of the jaws will be tightly gripped therebetween and also whereby wires or the like, inserted between the cutting blades 2 can be readily severed with the least amount of physical exertion upon the part of the operator. The leverage obtained between the jaws and handles is also sufficient to permit of the tool being employed as a nut wrench.

It is believed the foregoing description will fully and clearly set forth my improved device and the advantages thereof to those skilled in the art to which such invention relates so that further detailed description will not be required. Obviously I do not wish to be restricted to the precise details herein set forth and, therefore, such changes may be made therefrom as fairly fall within the scope of what I claim.

Having described the invention, I claim:

A pair of pliers comprising jaws arranged for cooperation, and having cutting blades arranged for shearing action thereon, one of said jaws having a central inwardly extending ear, the other jaw having a pair of spaced centrally extending ears receiving therethrough the first named ear and being pivoted to said ear, said jaws from their pivots having their sides reduced and their ends merging into reduced centrally arranged tongues, handle members having bifurcated ends receiving therein and being pivotally secured to the ears, links arranged in pairs and having one of their ends pivotally secured to the jaws, and their other ends lapping the handles, said handles having elongated slots and pivots passing through the ears and slots, each pair of links having centrally arranged inwardly extending ears whose peripheries are round, the said ears being arranged in lapping relation and being pivotally connected and the links having their outer faces at points surrounding the ears reinforced.

In testimony whereof I affix my signature.

JOHN C. LEBHERZ.